United States Patent [19]

Fisch et al.

[11] 4,038,080

[45] July 26, 1977

[54] FIX AND BLEACH-FIX BATH DESILVERING

[75] Inventors: Richard S. Fisch; Norman Newman, both of St. Paul, Minn.

[73] Assignee: Minnesota Mining and Manufacturing Company, St. Paul, Minn.

[21] Appl. No.: 290,972

[22] Filed: Sept. 21, 1972

[51] Int. Cl.² .................. G03C 5/26; G03C 5/32; G03C 5/38
[52] U.S. Cl. .................. 96/60 BF; 96/50 A; 96/61 R
[58] Field of Search .................. 96/60, 60 BF, 61 R, 96/50 A; 75/118 P

[56] References Cited

U.S. PATENT DOCUMENTS

| | | | |
|---|---|---|---|
| 1,448,475 | 3/1923 | Weisberg | 75/118 P |
| 2,503,104 | 4/1950 | Farber | 75/118 P |
| 2,688,548 | 9/1954 | Reynolds | 96/66.3 |
| 2,688,549 | 9/1954 | James et al. | 96/66.3 |
| 3,700,450 | 10/1972 | Cooley | 96/60 BF |

FOREIGN PATENT DOCUMENTS 1,131,096   10/1968   United Kingdom ............... 96/60 R

*Primary Examiner*—Mary F. Kelley
*Attorney, Agent, or Firm*—Cruzan Alexander; Donald M. Sell; Mark A. Litman

[57] ABSTRACT

Silver is removed from used fix or bleach-fix baths by adding a compound of the general formula:

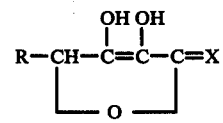

wherein:
X is an oxygen atom or imino group, R is an aryl, or a group of the formula $$R_1CH_2(CHOH)_{n-1}$$

wherein $n$ is a positive integer from 1 to 4, and $R_1$ is either a hydrogen atom or hydroxyl group when $n$ is 2 to 4 and is an hydroxyl group when $n$ is 1.

4 Claims, No Drawings

FIX AND BLEACH-FIX BATH DESILVERING

Photographic fixer baths are used to remove unreacted silver halide from silver halide photographic elements. The silver halide is converted to a soluble compound by reaction of silver with a complexing material. Such complexing materials are most often a water-soluble thiosulfate salt (e.g., sodium or ammonium thiosulfate). The fixing baths generally contain the solubilizing salt, pH buffering materials and optional addenda.

Bleach-fix baths, commonly used in color processes, are used not only to solubilize the unreacted silver halide but in addition to oxidize the silver image so that the image silver can be solubilized. Such bleach-fix solutions are comprised of a silver halide solvent (of the same types used in photographic fix baths), and a bleaching (oxidizing) agent. The bleaching agent may be chosen from a variety of known materials such as organic oxidizing agents (e.g., quinone, azodicarbonamide) and the more common complexed metal agents. The complexed metal bleaching baths consist of a multivalent metal in its highest oxidation state (e.g., ferric, cupric, cobaltic, etc.) and a complexing agent (e.g., cyanide, amine, aminopolycarboxylic acids, such as the chelating agents [ethylenediaminetetraacetic acid or "EDTA"]). Additionally, the bath may contain such other addenda as pH buffers, preservatives, etc. Among the bleach-fix baths, the combination that is most often employed is the thiosulfate/ethylenediaminetetraacetoferrate (III) (Fe-EDTA) system.

Several methods are presently known for the recovery of silver from such baths after they have been used and have picked up silver from the photographic elements. In general these known methods are of three types:

1. precipitation of the silver by the addition of a chemical agent which forms an insoluble silver salt,
2. metallic replacement in which the solution is exposed to a metal more electropositive than silver which serves to replace the dissolved silver, and
3. electrolytic recovery in which the silver is plated out on the cathode of an electrolytic cell.

Each of these techniques have their respective advantages and disadvantages. The electrolytic recovery of silver results in a high purity silver deposit but requires the use of expensive equipment and is a relatively slow process. The metal replacement techniques require the addition of bulk metals and/or recirculation through metallic materials to effect the displacement reaction, and as such contribute extraneous materials to the effluent. The recovered silver is then also in combination with these other metals which makes separation of the silver difficult. Chemical agent precipitation reaction rates are relatively rapid, but the agents used (e.g., sodium sulfide) contribute noxious odors to the air and undesirable impurities to the solutions during and especially after desilvering. The solutions desilvered by this technique may often be unusable because of some residual, unreacted agent contained therein.

All of these techniques experience further complications when the recovery medium is a bleach-fix bath, especially the thiosulfate -Fe- EDTA systems where the desilvered baths are to be reused.

An extensive compilation of the pertinent technical literature and materials used in desilvering photographic fixer baths is included in an article by M. L. Schreiber entitled "Present State of Silver Recovery in Motion Picture Laboratories" Journal of the S.M.P.T.E., Vol. 74, pp. 503–513, June, 1965.

Silver recovery from the EDTA bleach-fix system is described in U.S. Pat. No. 3,634,088.

The reuse of the bleach-fix bath of the ferric EDTA - sodium thiosulfate system involves desilvering the used bleach-fix bath, aerating the desilvered system, and reconstituting the bath. The most widely used bleach-fix desilvering technique for this type of bleach-fix system is one of metallic replacement. The silver-rich, used bleach-fix is caused to flow into a cartridge, usually containing steel wool. The iron displaces the silver in solution, but a quantity of iron is also brought into solution beyond the equivalent amount of silver displaced. This technique leads to an ever increasing quantity of iron in the desilvered bleach-fix solution. Before reuse, this increasing amount of iron must be compensated for by discarding a portion of the non-silver, iron-rich solution. Such discards usually constitute about 20% of the total volume and, depending upon the particular formulation used, may even be higher. Some of the active bleach-fix components are also discarded and lost with the excess iron-rich solution so that additional chemical costs are incurred in reconstituting the desilvered bleach-fix into a working bath.

It is the object of this invention to disclose a silver recovery technique that will present the advantages of both the chemical (fast rate of precipitation) and electrolytic (relative high purity of Ag removed) silver recovery techniques, but without their coincident disadvantages. This technique is applicable for desilvering both fix and bleach-fix solutions and presents particular advantages when used with bleach-fix solutions of the EDTA systems. When used for silver recovery in such systems, the discard of the solution to reconstitute the bath after desilvering and aerating is kept to a minimum, considerably below the normal 20% discard level. This, of course, reduces the additional costs of the reconstituting procedure.

We have found that the addition of compounds of the general formula:

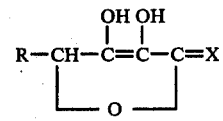

wherein:
X is an oxygen atom or imino group, R is an aryl group, or group of the formula

wherein $n$ is a positive integer from 1 to 4, and $R_1$ is either a hydrogen atom or hydroxyl group when $n$ is 2 to 4 and is an hydroxyl group when $n$ is 1 to silver-rich, used fix or used bleach-fix baths results in the precipitation of a high purity metallic silver deposit and that such desilvered baths can thereafter be reconstituted and reused.

The aryl group in the formula defined above is limited only by the requirement that the compound remain water-soluble. Since the aryl group is not in that portion of the compound which reduces the silver, substantially any moieties may be included therein as long as the molecule remains water-soluble.

The quantity of these materials sufficient to precipitate the silver which must be added is dependent, of course, on the concentration of silver in the used bath. However, it is necessary to have present a minimum amount of material of about 12 g/l for a fix and about 15 g/l for a bleach-fix.

The relative minimum amount of the precipitating agent may also be expressed in terms of molar ratios. For used fix baths, the minimum molar ratio usable is approximately 0.75 moles of precipitating agent per mole of complexed silver in solution. This ratio is for a fairly concentrated solution of 10 grams of complexed silver per liter. In absolute terms, a minimum of about 0.068 moles/liter of precipitating agent is required.

The process of this invention can be applicable to the precipitation of silver from solutions where the concentration of silver is not as high as about 4 g/l but may be as low as 1 g/l. The same minimum amount of desilvering material must be used. However, without any modification of the process, the induction time for initiating the precipitation can be very high, so that it might take days for the silver to precipitate out. It is generally known in the art that generation of silver by precipitation, or deposition is autocatalytic. That is, once there is some amount of silver present it catalyzes the rest of the silver out of solution. Therefore, in solutions where the silver is present, but in concentrations that it is not immediately precipitated out upon addition of the required minimum of the desilvering material, the solution may be seeded, either with metallic silver or other particulate material to supply nucleating sites for the silver in solution. Very little of this seed material is required to initiate the precipitation of the silver in solution. Examples V and VI show this.

The following examples are illustrative of the compositions used in the desilvering process:

EXAMPLE I 15 g of ascorbic acid were added per liter of used silver-rich fixer bath containing:

| | |
|---|---|
| sodium thiosulfate | 600 ml |
| sodium sulfite | 15 g |
| acetic acid (28%) | 48.0 ml |
| boric acid (crystals) | 7.5 g |
| potassium alum | 15.0 g |
| water | to 1 liter |

The solution was then allowed to stand for 60 minutes. A sludge of silver precipitate formed. The solution was then filtered and reused for fixing photographic film with very satisfactory results.

EXAMPLE II 15 g of ascorbic acid was added per liter of used silver-rich bleach-fix solution containing:

| | |
|---|---|
| NaFe EDTA | 40 g |
| Na$_2$ EDTA | 15 g |
| ammonium thiosulfate (60%) | 200 ml |
| sodium sulfite | 10 g |
| water | to 1 liter |

The solution was allowed to stand for 75 minutes. A sludge of silver precipitate formed. The solution was filtered and aerated. An aliquote of 950 ml of the aerated solution was combined with 50 ml of a solution containing:

| | |
|---|---|
| NaFe EDTA | 2 g |
| Na$_2$ EDTA | .75 g |
| ammonium thiosulfate (60%) | 10 ml |
| sodium sulfite | 0.6 g |

The resulting solution was used as a bleach-fix bath with very satisfactory results.

EXAMPLE III 17.5 g of araboascorbic acid, a sugar-type derivative of ascorbic acid, was added per liter of the used silver-rich fixer bath of Example I. The solution was allowed to stand, and a sludge of silver precipitate formed. The solution was then filtered and reused for fixing photographic film with very satisfactory results.

EXAMPLE IV 21.5 of 4-o-sulfophenyl-2-oxy-tetronimide was added per liter of the used silver-rich fixer bath of Example 1. The solution was allowed to stand, and a sludge of silver precipitate formed. The solution was then filtered and reused for fixing photographic film with very satisfactory results.

EXAMPLE V

A. 100 ml of a bleach-fix as previously defined containing 4 g/l of silver ion (complexed) was treated with 1 g of ascorbic acid. After 24 hours no visible precipitation silver metal was observed.

B. The above example was re-run using 100 ml of a photographic fixer as previously defined and containing 1.6 g/l of (complexed) silver ion. Again no discernable precipitate was formed after 24 hours.

EXAMPLE VI

A. To 100 ml of a fixer solution (as previously defined) containing 1.6 g of silver ion (complexed), one gram of ascorbic acid (approximately 0.057 moles) was added; in addition a very small quantity of powdered silver metal was added; there was no discernable precipitation of silver metal.

B. To 100 ml of a fixer solution (as previously defined) containing 1.6 g of silver ion (complexed) 1.2 g of ascorbic acid was added; in addition a very small quantity of powdered silver metal was added; there was a precipitate after 24 hours.

Any of the stereoisomers or mixtures thereof represented by the structural formulas are contemplated in the practice of this invention.

Other specific compounds contemplated by the invention are isoascorbic acid and other ascorbic acid analogs, e.g., sorboascorbic acid, lactoascorbic acid, maltoascobic acid, glucoascorbic acid, galactoascorbic acid, guloascorbic acid, alloascorbic acid, etc. Also contemplated are iminoascorbic acid, imino-isoascorbic acid and other iminoascorbic acid analogs such as imino-fucoascorbic acid, imino-gluheptoascorbic acid, imino-erythoascorbic acid, imino-rhamnascorbic acid, etc.

All of these materials will reduce the silver which is complexed in the used fix or bleach-fix bath to precipitate the metal.

What we claim is:

1. A method for desilvering a used photographic fix or bleach-fix bath which comprises adding at least one compound from the group consisting of ascorbic acid, araboascorbic acid, and 4-o-sulfophenyl-2-hydroxytetronimide to a used fix or bleach-fix bath containing complexed silver in an amount sufficient to precipitate the silver in solution and thereby precipitating said silver, wherein at least 12g of the compound are added per liter of used fix bath and wherein at least 15g of the compound are added per liter of used bleach-fix bath.

2. The method of claim 1 wherein the used photographic fix or bleach-fix solution is allowed to stand after addition of said compound so that the silver precipitates.

3. The method of claim 2 where silver is added to the solution to catalyze the precipitation.

4. The method of claim 2 wherein the added compound is ascorbic acid.

* * * * *